Feb. 7, 1956 J. A. RAJCHMAN 2,734,184

MAGNETIC SWITCHING DEVICES

Filed Feb. 20, 1953 3 Sheets-Sheet 1

INVENTOR.

Jan A. Rajchman

BY Morris A. Rebkin

ATTORNEY

INVENTOR
Jan A. Rajchman
BY Morris Rabkin
ATTORNEY

INVENTOR.
Jan A. Rajchman
BY Morris A. Rabkin
ATTORNEY 2,734,184

MAGNETIC SWITCHING DEVICES

Jan A. Rajchman, Princeton, N. J., assignor to Radio Corporation of America, a corporation of Delaware Application February 20, 1953, Serial No. 337,902

29 Claims. (Cl. 340—166)

Figure 1:
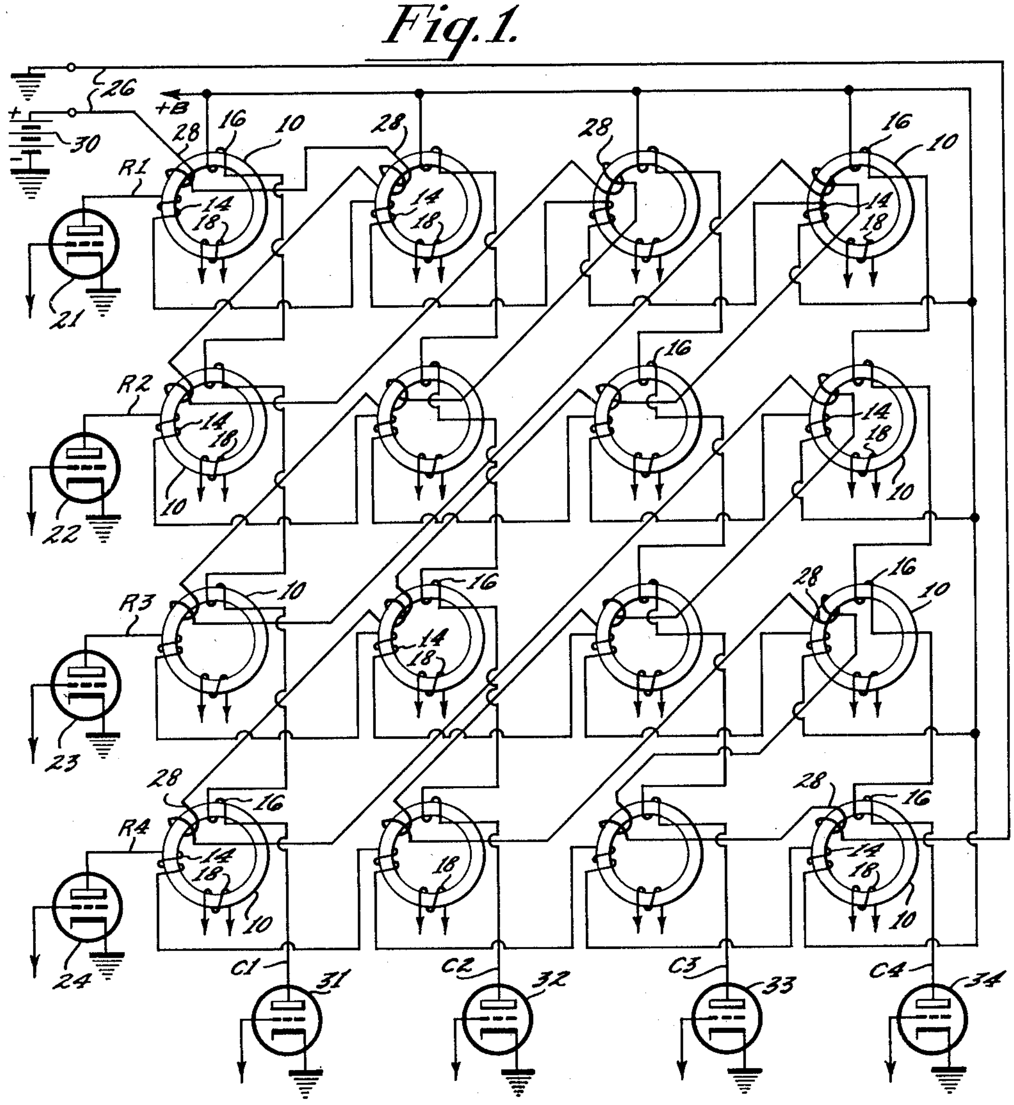

This invention relates to magnetic switches of the type wherein a plurality of magnetic cores have a plurality of selecting coils coupled thereto for switching the cores selectively, and more particularly to an improved form of such magnetic switches.

Magnetic switches of the type referred to are found described in an article entitled "Static Magnetic Matrix Memory and Switching Circuits," by Jan A. Rajchman, published in the RCA Review for June 1952, and are further described in application Serial No. 275,622, filed March 8, 1952, entitled "Magnetic Matrix and Computing Devices," by this applicant and assigned to the same assignee. Magnetic switches of the type to which this invention relates are also described and certain features thereof claimed in applicant's copending application, Ser. No. 327,234, filed December 22, 1952.

These switches include a number of magnetic cores, preferably, but not necessarily, of toroidal shape, and preferably having a substantially rectangular hysteresis characteristic. A number of selecting coils are inductively coupled to all the cores by means of coil windings. The sense of these coil windings is determined in accordance with a desired coupling code. The coils are usually formed in coil pairs, each coil pair representing, in an exemplary code, an order in a binary digit number. If each one of the cores is given a binary number having as many digits as there are coil pairs, then, by an arrangement of the sense of the windings in each coil pair, a mode of selection of any one of the cores by selecting the proper coil in each coil pair is provided. As the size of magnetic switches using the above generally described structure is increased, it will be appreciated that the number of coils, and accordingly the number of windings on each core, increases considerably. A system for reducing winding turns upon each core pair, while preserving the switching functions, would obviously both simplify the magnetic switch and reduce its cost.

As the size of the magnetic switches increases, another effect arises which can have adverse effects upon the operation of the switch. This effect is that capacitive delays caused by the windings of the coils may grow to such proportions as to prevent coincidence in operation of a number of selecting coils on a core, and thus a selected core will not turn over unless the currents applied to the selecting coils are applied for a sufficiently long period of time.

It is an object of the present invention to reduce the complexity of magnetic switches of the type described.

It is a further object of the present invention to provide a magnetic switch which minimizes the delay effect provided by large numbers of winding turns on a core.

It is still a further object of the invention to provide a novel, improved and simple switch which avoids spurious outputs.

Still another object is to provide a magnetic switch which can be constructed of inexpensive materials.

These and further objects of the invention are achieved by providing a magnetic switch of the type described with an additional coil which is inductively coupled to all the cores in the switch by windings. Current is applied to this coil in such a direction that an inhibiting magnetomotive force is applied to each core. This magnetomotive force is made to have an amplitude which is less than the sum of the magnetomotive forces applied to a core when it is driven from a magnetic saturation in one polarity to magnetic saturation in the opposite polarity by being selected by the selecting windings. The excitation of the inhibiting winding may be by pulsing synchronously with the selecting coil excitations or it may be by applying a continuous D. C. current to the winding. The additional inhibiting action coil permits a reduction in the number of required selecting coils by increasing the selectivity of the switch action with fewer selecting coils.

Figure 2:
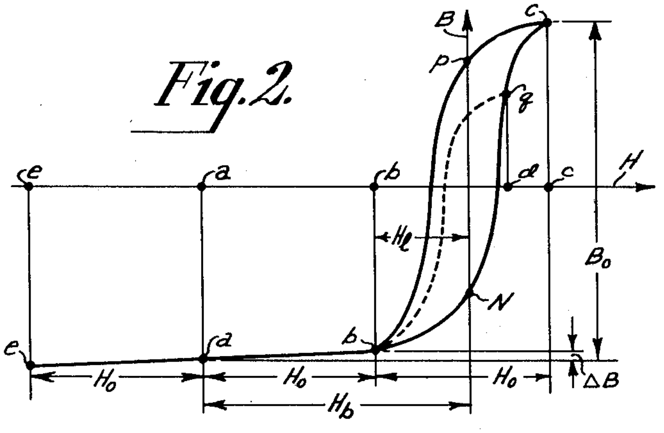
Figure 3:
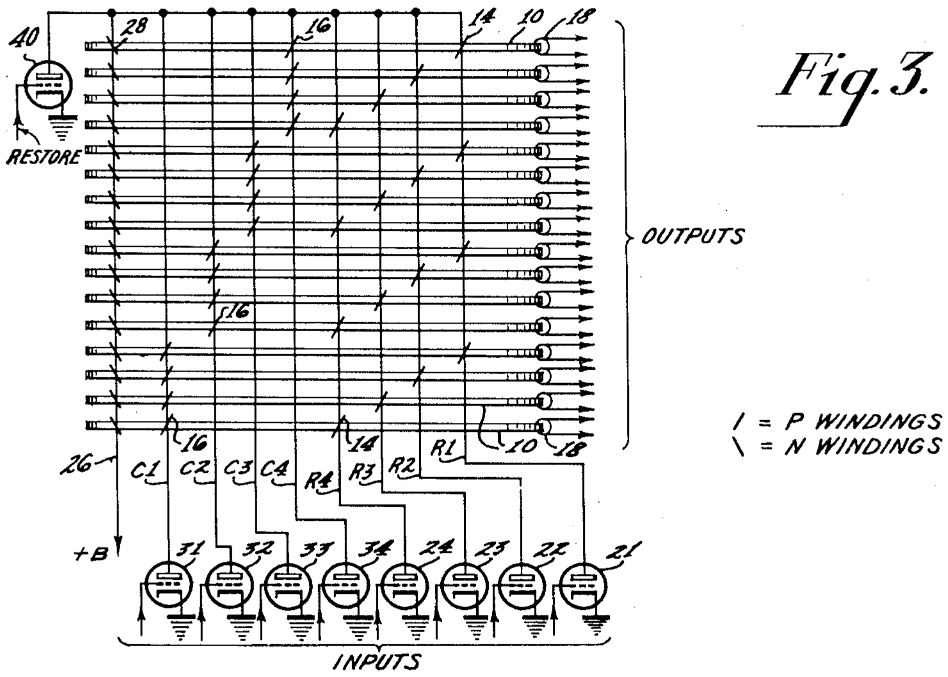
Figure 4:
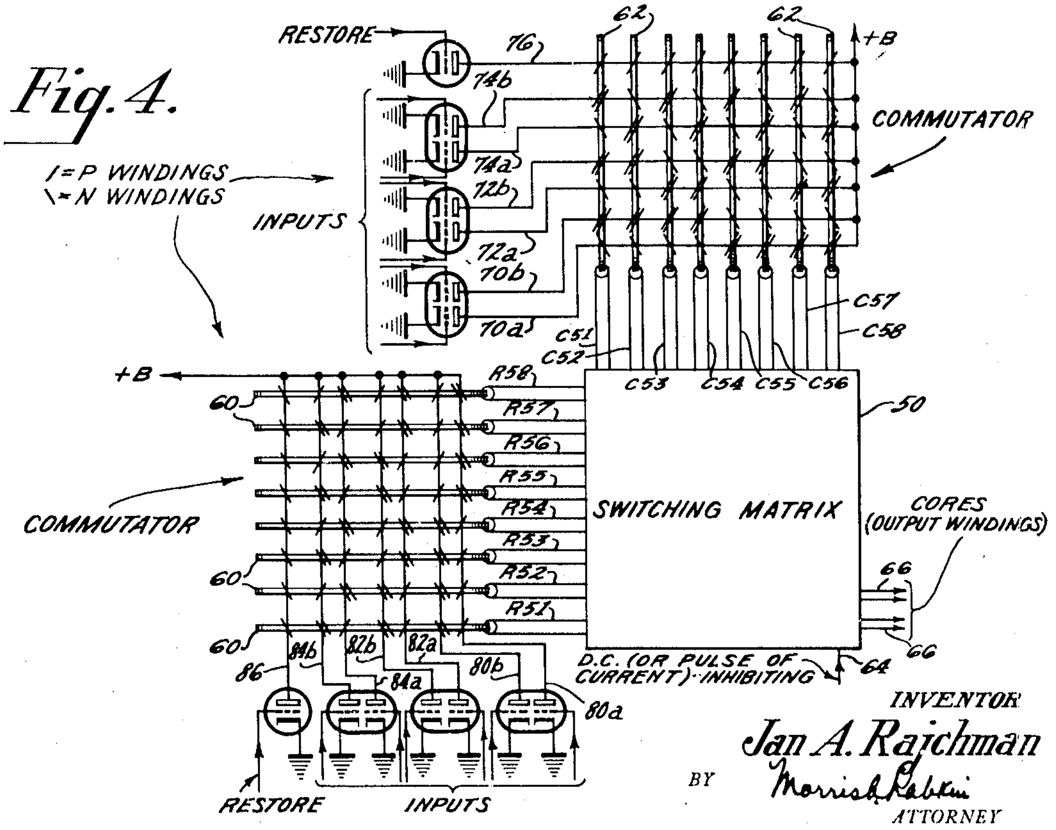
Figure 5:
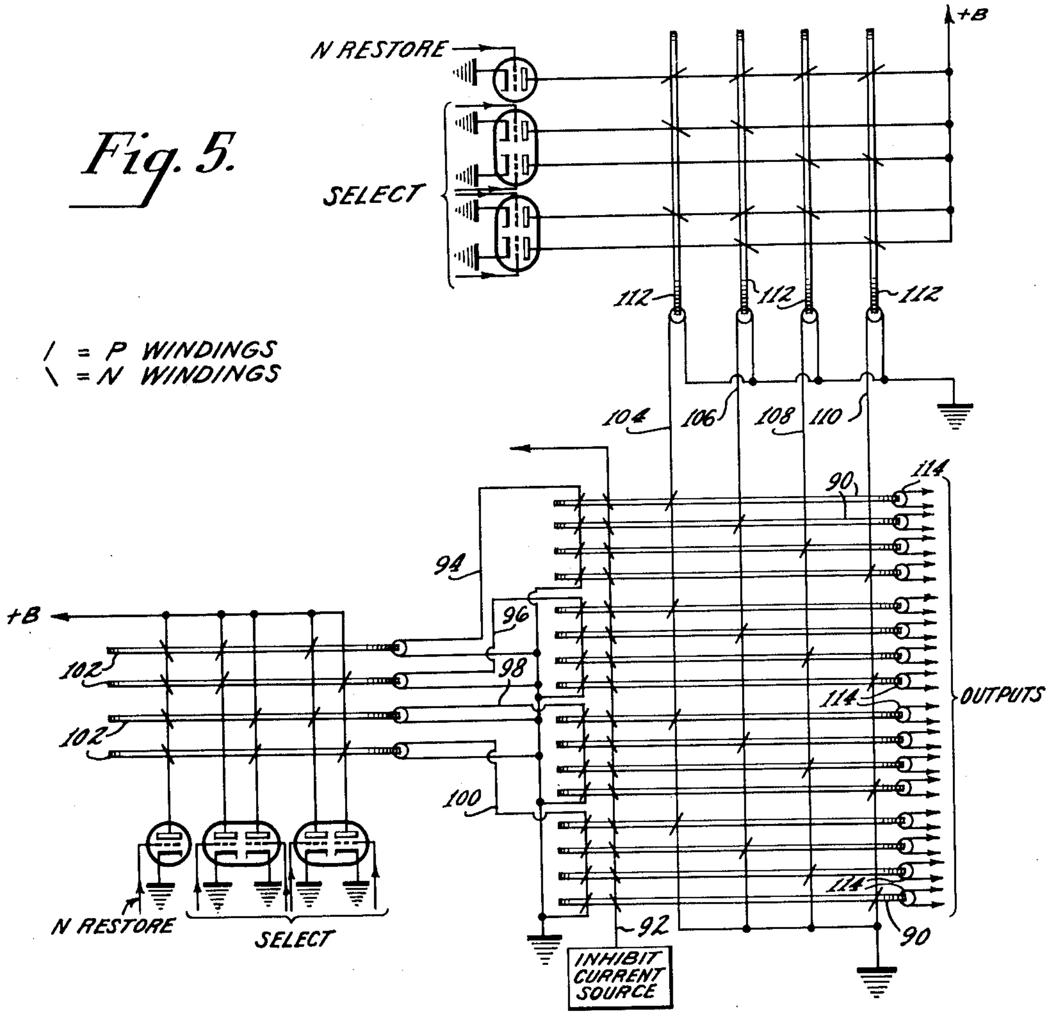
Figure 6:
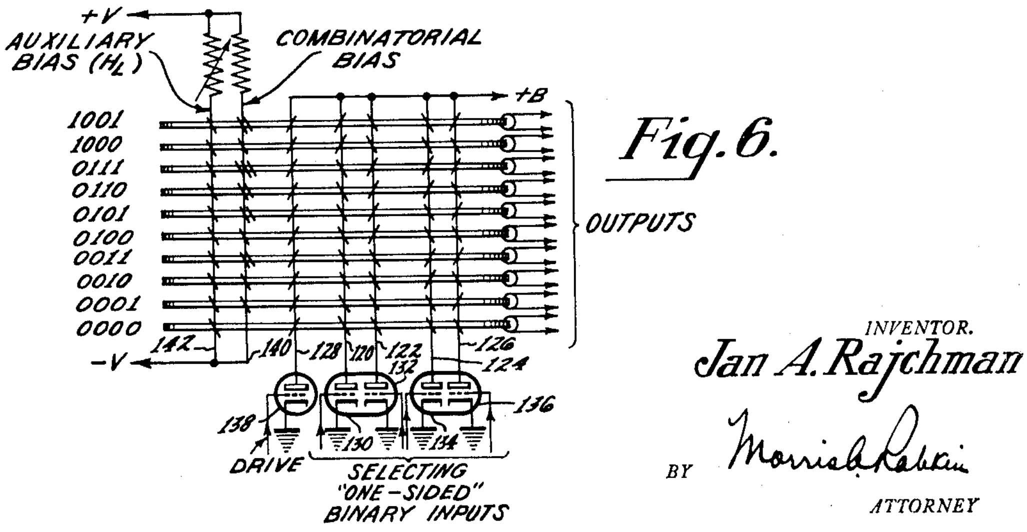

The novel features of the invention, as well as the invention itself, both as to organization and method of operation, will best be understood from the following description, when read in connection with the accompanying drawings, in which Figure 1 is a magnetic switch including an embodiment of the invention, Figure 2 is a curve showing the hysteresis characteristics of a typical magnetic core, Figure 3 is another magnetic switch showing another embodiment of the invention, and Figures 4, 5 and 6 are schematic drawings of other embodiments of the invention.

Referring now to Figure 1, there may be seen a schematic drawing of an embodiment of the invention. It comprises a magnetic switch which includes 16 cores 10. A greater or smaller number of cores may be used as required; the number shown here is merely by way of example. These are arrayed in rows and columns for convenience. Each core 10 is made of a magnetic material and is preferably toroidal in shape, although other shapes may be used. Each row of cores has inductively coupled thereto a separate row coil $R_1$–$R_4$. The inductive coupling is provided by a winding 14 on each core. These windings are connected in series to form the coils. One end of each row coil is connected to a source of B+. The other end of each row coil is connected to a switching means which herein is exemplified by a vacuum tube 21–24. This switching means provides a mechanism for selectively exciting with current, a desired one of the row coils. Switching signals may be provided from any desired source (not shown). Similarly, each column of cores is inductively coupled to a separate column coil $C_1$–$C_4$. Such coupling is made by windings 16 on a core 10, the windings on each core in a column being connected in series to form a column coil. One end of each column coil is connected to a source of operating potential, and the other end of each column coil is connected to a separate vacuum tube 31–34, which is exemplary of a switching means for exciting a desired one of these column coils. Each core in the switch has a separate output winding 18. This can be connected to an external load to be switched. This may, for example, be another magnetic switch core or a magnetic matrix memory core.

The cores are usually, prior to operation of the switch, set to have a magnetic saturation polarity, for example, at point N on the hysteresis characteristic curve shown in Fig. 2. A core is selected by exciting one of the column coils and the one of the row coils which are coupled to that core. The amplitude of the exciting currents is chosen so that a column coil alone or a row coil alone provides an insufficient magnetomotive force to drive a core from saturation N to saturation P as shown on the hysteresis curve. However, the magnetomotive force applied by the two coils coincidentally to the core to which they are coupled, is sufficient to drive that core to saturation P. A driven core, in turning over, induces a voltage in its output coil, thereby signifying the fact that it has been switched. A core can be set to N by reversing the current through the two selecting coils or by providing an auxiliary N restore winding (not shown). As thus far described, there is no departure from what has been already described in the above noted application and article.

The invention herein comprises the provision of an additional inhibiting coil 26 for the magnetic switch as well as the biasing excitation applied. This inhibiting coil is inductively coupled to all the cores in the switch. The windings 28 of the inhibiting coil are connected in series so that one coil is coupled to all the switching cores 10. The inhibiting coil has a direct current applied thereto from a source 30 which inhibits the switching action so that none of the cores is affected unless it receives the full P going magnetomotive forces from both coils coupled thereto. Consequently, only the selected core receives a positive net magnetizing force, all the other cores being subject to a negative or no net magnetizing force.

When the P going excitation is applied to a selected row and column coil, only the core at the intersection of these coils receives the double excitation and is driven. However, other cores are coupled to the excited row and column coils also. These other cores receive only a single unit of excitation from the excited row and column coils. Although this drive does not cause these cores to be driven to P, it still causes them to make some magnetic excursions. This occurs in view of the fact that the slope of the hysteresis characteristic curve is not zero in the P or N saturation regions, but does have a finite value. This can lead to spurious outputs being indicated in the various output coils coupled to these "half driven" cores. By using an inhibiting magnetomotive force, which is equal to or greater than the magnetomotive force applied to a core by a single coil which is excited, the effects of the magnetic excursions are substantially minimized or eliminated. Furthermore, the discrimination of the selecting coils in switching is increased, since, instead of the switch cores requiring for core selection a discrimination between half the required magnetomotive force and the required magnetomotive force, with the use of the inhibiting coil a core requires the application of the total magnetomotive force or it will not be driven.

The amplitude of the selecting pulses required, when an inhibiting current is used, must be made larger than when not used, but there are compensations. As an illustration, referring to Figure 2, if, using an inhibiting force the cores in the switch are positioned at saturation at point *b* in the N saturation region of the curve, the drive required to bring the core up to point C in the P saturation region is twice the distance between point *b* and the abscissa or $2H_1$. It will be readily appreciated that any core receiving a drive of $H_1$ will have a considerable magnetic excursion to point N and thus provide spurious output.

Assume, by using an inhibiting magnetomotive force, $H_b$, the cores in the switch are positioned at point *a* on the characteristic curve, chosen so that the distance *ab* equals the distance *bc*. Each selecting coil provides a magnetomotive force equal to $H_0$, half the total magnetomotive force required. It will be appreciated that when a core is driven from point *a* to point *b* on the hysteresis curve by one of the selecting coils, the change in flux is $\Delta B$. This is much less than the change in flux which occurs when a core is driven from point *b* to N (when no inhibiting currents are used). Thus, the use of an inhibiting coil serves to substantially prevent spurious voltages from appearing in the output coils of cores which are partially driven.

Another advantage of the operation of a switch with an inhibiting coil is that no N restore coil is required to reset the cores in a starting condition, as was required heretofore with previous switches, since if the inhibiting current is maintained continuously, as soon as the selecting currents are terminated, the selected core will be automatically restored to point *a* on the hysteresis curve. If an inhibiting current is applied simultaneously with selecting currents a restoring action may be obtained either by applying the inhibiting current longer than the selecting current or by applying a restoring current pulse to the inhibiting coil after the selecting currents have ceased.

The magnetic materials required for the switch cores need not have as rectangular a characteristic as is required with previous switches when the biasing of the cores is obtained by using an inhibiting current and coil. The reason that satisfactory operation is still obtained is that external current sources determine at all times what the magnetic position of a core is, i. e., either the biasing current or the selecting currents. Reliance for discrimination upon the remanence of a core or its coercive force is no longer required. Since non-rectangular characteristic materials are plentiful and inexpensive, a less costly switch may be constructed.

Another important method of utilizing a switch using the inhibiting coil is possible which in some degree permits saving power. In making a selection, a desired core need not be driven all the way to P saturation, but may be driven only to that point on the hysteresis characteristic which provides a sufficiently large output voltage in the output coil so that this output is distinguishable over any spurious voltages which are induced in the other output coils on the unselected cores. This may, for example, be point *d* on the characteristic curve shown in Figure 2. To reach this point less current is required in the selecting coils than to reach point C. When the cores of a switching matrix are loaded by loads connected to the output coils, such a drive in the steep region of the characteristic curve enables a current rather than a voltage transfer through the core. This is a desirable condition when the switching matrix is used to drive the cores of an information matrix.

Any geometrical arrangement of the cores for the switch is possible. Alternative to the arrangement shown in Fig. 1 is one wherein the cores are arranged in a single line as shown in Fig. 3. It will be noticed that the combinatorial system of windings is exactly the same with either geometrical disposition. Similar reference numerals are used to identify the same components in both figures. The arrangement shown in Fig. 3 has the advantage that all outputs are conveniently accessible, while in the arrangement of Fig. 1, they have to be taken out of a square.

It will be noticed that, as before, the selection for driving a core requires excitation of the two selecting coils coupled to the desired core. The inhibiting coil 26 is here shown in series with the selecting coils $C_1$–$C_4$, $R_1$–$R_4$, so that it is excited simultaneously with them. This winding scheme requires the use of an auxiliary N restore tube 40 to restore a core which is in P, to N. This is done by applying an exciting pulse to the grid of the N restore tube 40 which has the inhibiting winding connected as its plate load. To simplify the drawings, in Figure 3 and in the subsequent figures, each core is represented as a rectangular box. The winding 14, 16, 28 on a core is represented as a slanting line which makes an acute angle either to the left or to the right with the rectangular box. The angle to the right may be considered as representative of windings on a core having a P going sense; an angle to the left may be representative of windings on a core having an N going sense. The vertical line which connects the slanting lines is representative of the series connections of the windings on the cores to form coils.

When the cores are stacked instead of placed in an array, it is convenient to describe them as being divided into groups. Thus, each of the four groups represented has a different coil $C_1$–$C_4$, which is coupled to all the four cores in a group. Since there are 16 cores there are four groups. Of the remaining selecting coils, the first $R_4$ is coupled to a first core in each group, the second $R_3$ to a second core in each group, the third $R_2$ to a third core in each group and the fourth $R_1$ to a fourth core in each group. It should be appreciated that this scheme may be extended to any number of cores in a stack. Selection of a core for drive from N to P may be made by exciting both the selecting coil connected to all the cores in a group and the selecting coil connected to the desired core in that group.

When a core is selected to be driven, current is drawn through the two selecting coils and also simultaneously through the inhibiting coil. In the circuit shown, the current through the inhibiting coil will be approximately twice that of the current through either selecting coil. Therefore, the number of turns of the inhibiting coil windings should be smaller in order that a selected core may be driven. After the core selection is terminated, a signal to the grid of the restore tube 40 causes current to be drawn only through the inhibiting coil 26 and thereby the selected core is restored to the condition N. Of course in being driven from N to P by the selecting coils the core induces a voltage in the output coil 18 coupled thereto.

Figure 4 is a schematic diagram of a system for reducing the input selection requirements for a magnetic switch. A central magnetic switch 50 which has the square array of cores as shown in Figure 1, is represented by a rectangle. For illustrative purposes assume that the central switching matrix has 64 cores (8 x 8). Thus a selection of one out of 8 on each side is required in order to drive one of the 64 cores. This selection of 1 out of 8 on each side may be reduced by using two additional magnetic commutators. These are of the type shown and described in detail in the article by Rajchman and in his application Serial No. 275,622 referred to previously.

One magnetic switch has each of its cores 60 coupled to a different row coil $R_{51}$–$R_{58}$ and the other magnetic switch has each of its cores 62 coupled to a different column coil $C_{51}$–$C_{58}$ in a square matrix 50. The square matrix may have an inhibiting coil 64 (shown vestigially) therein which may be continuously excited by direct current or pulsed simultaneously with the selecting coils. One core 60, 62 in each switch is selected to be driven from N to P by applying signals to the tubes coupled to the selecting coils 70*a*, *b*–74*a*, *b*, 80*a*, *b*–84*a*, *b*, having only P going windings on the desired core. The row coil and column coil connected to these driven cores have current induced therein when the two cores are driven. The core in the switching matrix which receives the currents from the intersecting excited row and column coils is the core which is driven. In being driven the core in the matrix switch induces a voltage in its output coil 66 (shown vestigially). Each of the driving magnetic commutators has an N restore coil 76, 86. The driving commutators thus have their cores restored by applying a separate pulse to the vacuum tube connected to drive their N restore coils. Such N restore drives, if done simultaneously, can have the effect of restoring the driven core in the switching matrix. However, if the inhibit coil has D. C. bias applied it will automatically restore the core without external assistance. With the switching system shown, the reduction in inputs is, two "three out of six" inputs instead of, two "one out of eight inputs." The former is the much simpler of the two. The reduction is more readily appreciated if the switch sizes are increased. Two systems like the one shown in Figure 4 may be used to drive a magnetic matrix memory having 64 x 64=4096 cores.

Figure 5 represents another system for driving a magnetic switch by other magnetic switches. The central driven switch cores 90 are divided into four groups of four cores. An inhibit winding 92 is coupled to all the cores in the driven switch. Each group of cores is coupled to receive a P drive from a different output coil 94, 96, 98, 100 coupled to an associated core 102 in the first primary driving switch, selecting coils on 104, 106, 108, 110 on the driven switch have their windings sensed to apply a P drive to the cores. Each selecting coil 104—110 acts as an output coil for a different core 112 of a second primary driving switch. Each selecting coil is coupled to a different core 90 in each of the four core groups. The primary driving switches are of the type shown and described in application Serial No. 275,622 noted above. In operation, one core 102 in the first primary switch is driven which serves to select a group of cores in the driven switch and apply a P drive to every core in that group. One core 112 in the second primary switch is driven which selects a single core in each group of cores. Only that single core in that group of cores which is receiving a P drive from the first and second primary switches will be driven to saturation. The inhibiting coil is connected to all the cores in the core group, and is biased so that a double coincidence of P drives is required to overcome such bias and to turn over a core in the driven switch, thereby inducing a voltage in the output winding 114 of that core.

The first and second primary switches are of a type wherein a core is selected to be driven by exciting all the selecting coils coupled to that core. N restoration is obtained by applying a signal to the grid of the N restore tube which causes current to flow through the N restore coil coupled to its plate. If desired, the second primary switch may be replaced by vacuum tube drives which can be set up to await the operation of the first primary switch. It will be noted that two "two out of four" inputs are required to operate a sixteen core switch. The benefits of the cascaded driving system are greater with a greater size switch. The principles of this type of driving system are more fully explained in my two previous copending applications Ser. No. 302,161, filed August 8, 1952, and Ser. No. 327, 234 filed December 22, 1952. Here again, the advantage of using an inhibiting winding which is continuously excited is that as soon as the core selection is over the driven core in the driven switch is restored to its N condition.

The system using inhibition of all cores is not limited to double coincidence, but can be used for any number of coincident signals. For example, the cores may be thought to be arranged in a cubical array. One set of coils couple all cores in an *xy* plane, a second set in an *xz* plane and a third set of coils in a *yz* plane. The three coils coupled to a selected core are excited with +1 unit of magnetomotive force and the inhibit winding is made to be —2 units. Then only the selected core will have a positive excitation (1+1+1—2=1) while all others will have no or negative excitations. Of course, here again, the inhibit current $H_B$, if D. C., can be larger than $2H_0$. The biased-off point would then be such as point "*e*" on Figure 1.

In general, for a system with *n* coincident signals, $H_0$, the amplitude of the inhibit should preferably be $(n\text{-}1)H_0$. Improvement in discrimination is obtained when the inhibit, if D. C., is made slightly larger, i. e., $(n\text{-}1)H_0+H_L$. (See Figure 2.)

Reference is now made to Fig. 6, which shows still another type of magnetic switch employing an inhibiting coil. This is known as a single ended type of magnetic switch. Ten cores are shown for purposes of illustration. Each core has assigned thereto a binary number. Four selecting coils 120, 122, 124, 126 are shown, each one being coupled to all the cores in the switch by windings. The sense of the windings, whether P or N, is determined as follows: If each selecting coil is assigned an order in the core binary numbers, when the digit in the assigned order is zero, the winding will have an N sense and when the digit in the assigned order is one, the winding will have a P sense. A driving coil 128 is connected to all the cores by P sense windings. One end of all these coils are connected to a source of operating potential. The other ends are coupled to separate driven electron tubes 130, 132, 134, 136, 138. Selection of a core is made by looking at the core binary number and exciting only those tubes which are coupled to selecting coils having windings which correspond to the ones in the binary order position. The driving coil tube 138 is simultaneously excited. As an example, if core 0111 was desired, the driving coil tube 138 and the last three tubes 132, 134, 136 to the right would be excited.

The inhibiting coil consists of two parts 140, 142. The first part 140 is a coil which is inductively coupled to the cores by windings. The number of turns of these windings are equal to the number of turns of P going windings on a core which are provided by the selecting coils. Accordingly, this coil has no windings coupled to core 0000 and has two windings coupled to core 1001. The inhibiting effect of these windings which are excited will counteract the P driving effect of the selecting coils and the driving coil on all non-selected cores. It may be difficult wtih a single inhibiting winding to position a core accurately at the point of optimum efficiency when the saturation characteristic is considered. A second inhibiting coil is provided which is inductively coupled by windings on every core. The current applied to these windings is sufficient to obtain the favored operational point on the hysteresis characteristic curve, which can be point *e* shown in Fig. 2 on the curve.

It will be seen from the above described embodiments of the invention that the inhibiting coil provides a better operating switch in view of the increased discrimination provided by the action of the inhibiting winding. Furthermore, the use of the inhibiting coil permits the utilization of cheaper core materials in the switch, thus reducing switch costs. The inductance of the switch is minimized in view of the saturation of the cores by the inhibiting winding. Furthermore, transition between N and P states only occurs upon full coincidence of the selecting pulses.

The number of cores utilized in the switches described are merely exemplary. The switches may be expanded or reduced to have any desired number of cores using the above delineated principles.

What is claimed is:

1. A magnetic switch comprising a plurality of cores made of magnetic material, and means to selectively drive a desired one of said cores from magnetic saturation in one polarity towards magnetic saturation in the opposite polarity, said means including a plurality of selecting coils, said selecting coils being inductively coupled to said plurality of cores in accordance with a predetermined combinatorial code, means to selectively apply currents to certain ones of said selecting coils to provide only at said desired one of said cores a sum of magnetomotive forces sufficient to drive said core towards magnetic saturation in said opposite polarity, and means to apply an inhibiting magnetomotive force to all of the cores of said plurality which is less than and opposite to said sum of magnetomotive forces.

2. A magnetic switch as recited in claim 1 wherein said means to apply an inhibiting magnetomotive force includes a coil which is inductively coupled to all the cores in said switch, and means to apply current to said coil to provide an inhibiting magnetomotive force at each core which is exceeded only by the sum of the magnetomotive forces applied to a desired core by said selecting coils.

3. A magnetic switch comprising a plurality of cores made of magnetic material, a plurality of selecting coils, said coils being inductively coupled to said plurality of cores in accordance with a predetermined combinatorial code, means to selectively apply currents to certain ones of said selecting coils to provide only at a desired core a sum of magnetomotive forces sufficient to drive said core towards magnetic saturation of a desired polarity, an inhibiting coil inductively coupled to all the cores of said plurality of cores, means to apply a current to said inhibiting coil to provide a magnetomotive force at each core which is opposite to and is exceeded only by said sum of magnetomotive forces, and a plurality of output coils each of which is inductively coupled to a different one of said cores.

4. A magnetic switch comprising a plurality of magnetic cores, arranged in rows and columns, a plurality of row coils, each row coil being inductively coupled to a different row of cores, a plurality of column coils, each column coil being inductively coupled to a different column of cores, an inhibit coil inductively coupled to said plurality of cores, means to selectively excite a row coil and a column coil to drive from one magnetization polarity toward the opposite magnetization polarity a desired core coupled to said excited row and column coils, means to apply an inhibiting current to said inhibit coil to inhibit all said cores against the effects of an excited row coil and excited column coil when taken one at a time, and means to derive an output from each core being driven from said one to said opposite magnetization polarity.

5. A magnetic switch comprising a plurality of magnetic cores, a plurality of selecting coils, a different two of said selecting coils being inductively coupled to each of said cores, an output coil coupled to each of said cores, an inhibiting coil coupled to each of said cores, means to selectively apply current to the selecting coils coupled to a desired core to drive it from one magnetic saturation polarity toward the opposite magnetic saturation polarity, and means to apply an inhibiting current to said inhibiting coil to inhibit all said cores with a magnetomotive force exceeded only by the magnetomotive force applicable by all the selecting coil means coupled to a desired core.

6. A magnetic switch as recited in claim 4 wherein said means to selectively excite a row coil comprises a first magnetic switch and said means to selectively excite a column coil comprises a second magnetic switch.

7. A magnetic switch comprising a plurality of magnetic cores, a plurality of selecting coils formed into different groups of selecting coils, each said selecting coil being included in a number of said different groups, a different group of selecting coils being inductively coupled to a different core, an inhibiting coil coupled to all said cores, one end of each of said plurality of selecting coils being connected to one end of said inhibiting coil, means to apply an operating potential to the other end of said inhibiting coil, switch means coupled to the other ends of said plurality of selecting coils to selectively excite a group of selecting coils on a desired core to drive said core from a magnetic saturation in one polarity to magnetic saturation in the opposite polarity, the coupling of said inhibiting coil on a core being determined as the amount required to prevent a core from being driven to said opposite polarity magnetization by excitation of less than the entire selecting coil group coupled to said core, and switch means coupled to said one end of said inhibit coil to reset said cores in said one polarity of magnetic saturation.

8. A magnetc switch comprising a plurality of groups of magnetic cores, a plurality of selecting coils, a different one of said selecting coils being inductively coupled to all the cores in each of said groups, each of the remaining ones of said selecting coils being inductively coupled to a different core in each of said groups of cores, an inhibiting coil coupled to all the cores in said plurality of groups of cores, means to selectively apply current to the selecting coils coupled to a core group and to a desired core in said core group to drive said core from one magnetic saturation polarity toward the opposite magnetic saturation polarity, means to apply an inhibiting current to said inhibiting coil to maintain all said cores except a desired core being driven to said opposite magnetic saturation polarity and a plurality of output coils, each of which is inductively coupled to a different core.

9. A magnetic switch as recited in claim 8 wherein said means to selectively apply current to the selecting coils coupled to a core group and to a desired core in said core group includes a first magnetic switch having a plurality of magnetic cores, each core being inductively coupled to a different one of said different ones of said selecting coils, and a second magnetic switch having a plurality of magnetic cores, each core being inductively coupled to a different one of said remaining ones of said selecting coils.

10. The improvement in a magnetic switch of the type including (1) a plurality of magnetic cores which are in one polarity of magnetic saturation, (2) means to selectively drive a desired one of said magnetic cores towards magnetic saturation in the opposite polarity, and (3) an output coil on each of said cores, said improvement comprising means to maintain in said one polarity of magnetic saturation all of said cores except a desired one of said cores being driven, said last named means including at least one inhibiting coil inductively coupled to each of said cores, and means to apply an inhibiting current to said inhibiting coil.

11. The improvement in a magnetic switch of the type including (1) a plurality of magnetic cores which are in one polarity of magnetic saturation, (2) means to selectively drive a desired one of said magnetic cores towards magnetic saturation in the opposite polarity including a plurality of selecting coils, all but one of said coils being inductively coupled to each of said cores by windings wound in one sense or the opposite sense in accordance with a desired binary code, said one coil being coupled to each core by windings having said opposite sense, and (3) an output coil coupled to each of said cores, said improvement comprising means to maintain in said one polarity of magnetic saturation all of said cores except a desired one of said cores being driven including a first and a second inhibiting coil, said first inhibiting coil being coupled to each of said cores by windings wound in said one sense, the number of turns on each core being determined as the number of winding turns of said all but one selecting coils which are coupled to said core by windings of said opposite sense, said second inhibiting coil being coupled to all said cores by windings in said one sense, means to apply current to said first coil to inhibit said cores by an amount equal to the magnetomotive driving forces provided on each core by the excited all but one selecting coil turns in said opposite sense, and means to apply current to said second coil to inhibit said cores to a favorable operating characteristic.

12. A magnetic switch comprising a plurality of magnetic cores, each said core having an individual output winding and each said core having a plurality of coils inductively coupled therewith in accordance with a predetermined code, means to apply currents to said plurality of coils to provide only at a selected core a sum of magnetomotive forces sufficient to drive said selected core from magnetic saturation of one polarity toward magnetic saturation of another polarity whereby an output voltage is developed in that output winding inductively coupled to that said selected core, and means for applying an inhibiting magnetomotive force to each of said cores less than and in a sense opposite to that of said sum of magnetomotive forces.

13. A switch as claimed in claim 12, sand means for applying said inhibiting magnetomotive force comprising only a single coil inductively coupled to each of said cores.

14. A switch as claimed in claim 12, said means for applying said inhibiting magnetomotive force comprising a single coil inductively coupled to each of said cores, and a source of pulsed current connected thereto.

15. A switch as claimed in claim 12, said means for applying said inhibiting magnetomotive force comprising only a single coil inductively coupled to each of said cores, and a source of direct current coupled directly to said coil.

16. A switch as claimed in claim 12, said cores being arranged in rows and columns, said coils coupled to said cores in accordance with said code comprising a plurality of row coils, each said row coil being coupled to each core in a different row and a plurality of column coils, each said column coil being coupled to each core in a different column.

17. A switch as claimed in claim 12, said cores being arranged in a single line.

18. A switch as claimed in claim 12, said means for applying an inhibiting magnetomotive force being serially connected to said coils coupled in accordance with said code.

19. A switch as claimed in claim 18, said means for applying an inhibiting magnetomotive force comprising at least one coil coupled to each said core, said coded coils each being coupled to some less than all of said cores.

20. A switch as claimed in claim 19, said coded coils each having equal turns coupled to those cores to which each is coupled.

21. First, second, and third switches, each as claimed in claim 12, the said plurality of coils coupled to the said cores of said third switch in accordance with said predetermined code for said third switch including the output coils of said first and second switches.

22. The combination of a first magnetic switch as claimed in claim 12, a pair of secondary magnetic switches each having a plurality of cores, each said secondary switch core having an output coil, the said means to apply currents to said first switch plurality of coils including said secondary switch output coils.

23. The combination claimed in claim 21, said secondary switches each including an inhibit coil.

24. First, second, and third switches, each as claimed in claim 12, the said plurality of coils coupled to the said cores of said third switch in accordance with said predetermined code for said third switch including the output coils of said first and second switches, said first magnetic switch cores being arranged in rows and columns.

25. A switch as claimed in claim 12, said means for applying an inhibiting magnetomotive force including a plurality of coils combinatorially coupled to said cores.

26. A switch as claimed in claim 25, said plurality of coils coupled to said cores in accordance with said code being paired except for one and only one driving coil, and further comprising means to operate one and only one coil of each said pair and said driving coil in coincidence.

27. A switch as claimed in claim 12, said plurality of coils coupled to said cores in accordance with said code each being coupled to every said core, the coupling to some cores being different in turns from that to other cores for the same coil, and also the coupling to some cores being different in sense from that to other cores for the same coil.

28. A magnetic switch comprising a plurality of cores having two senses of magnetic saturation and initially saturated in the first of said senses, a plurality of coils coupled in different ways to said cores, and means to pass current coincidentally through selected coils to drive a selected core to saturation in the other said sense, said current carrying coils including at least one coupled in a sense to inhibit saturation of at least one other core in said other sense, which other core would otherwise be saturated in said other sense, and thus maintaining said other core saturated in the first said sense.

29. A magnetic switch comprising a plurality of cores having two senses of magnetic saturation and capable of being initially saturated in the first of said senses, a plurality of coils coupled in different way to said cores, and means to pass current coincidentally through selected coils to drive a selected core to saturation in the other said sense, said selected coils including at least one coupled in a sense to inhibit saturation of at least one other core in said other sense upon passage of said current, and thus maintaining said other core saturated in the first said sense.

No references cited.